(12) United States Patent
Takizawa (10) Patent No.: US 10,375,263 B2
(45) Date of Patent: Aug. 6, 2019

(54) READING APPARATUS AND CONTROL METHOD FOR READING APPARATUS

(71) Applicant: SEIKO EPSON CORPORATION, Tokyo (JP)

(72) Inventor: Masaaki Takizawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/922,224

(22) Filed: Mar. 15, 2018

(65) Prior Publication Data

US 2018/0278778 A1 Sep. 27, 2018

(30) Foreign Application Priority Data

Mar. 23, 2017 (JP) ................................. 2017-056950

(51) Int. Cl.
*H04N 1/00* (2006.01)
*H04N 1/04* (2006.01)
*G06K 9/00* (2006.01)

(52) U.S. Cl.
CPC ..... *H04N 1/00798* (2013.01); *G06K 9/00402* (2013.01); *H04N 1/0057* (2013.01); *H04N 1/04* (2013.01)

(58) Field of Classification Search
CPC .... H04N 1/00798; H04N 1/0057; H04N 1/04; G06K 9/00402

USPC ......................................................... 358/443
See application file for complete search history.

(56) References Cited

U.S. PATENT DOCUMENTS

| 5,189,528 | A | * | 2/1993 | Takashima | ........... H04N 1/4076 |
| | | | | | 348/E5.081 |
| 2006/0132863 | A1 | * | 6/2006 | Yoshida | ............. H04N 1/00602 |
| | | | | | 358/474 |
| 2007/0242098 | A1 | * | 10/2007 | Sudo | ........................ B41J 2/155 |
| | | | | | 347/40 |
| 2016/0214378 | A1 | * | 7/2016 | Yoshida | ............... B41J 2/04553 |

FOREIGN PATENT DOCUMENTS

JP 2006-203840 A 8/2006

* cited by examiner

*Primary Examiner* — Allen H Nguyen
(74) *Attorney, Agent, or Firm* — Foley & Lardner LLP (57) ABSTRACT

A reading apparatus includes a first line sensor and a second line sensor, and a plurality of signal processing circuits including a first signal processing circuit, the plurality of signal processing circuits configured to receive signals from a corresponding line sensor. The first line sensor corresponds to the first signal processing circuit, and the first line sensor and the second line sensor are arranged in such a way as to be separate from each other in a transport direction and overlap with each other in an intersecting direction. A space is adjacent to the second line sensor in the intersecting direction, and the first signal processing circuit is arranged in the space. The first signal processing circuit is arranged to be adjacent to the first line sensor in the transport direction.

7 Claims, 5 Drawing Sheets

READING APPARATUS AND CONTROL METHOD FOR READING APPARATUS

CROSS REFERENCE TO RELATED APPLICATIONS

This application claims priority to Japanese Application No. 2017-056950 filed Mar. 23, 2017, the disclosure of which is hereby incorporated by reference in its entirety.

BACKGROUND

1. Technical Field

The present disclosure relates to a reading apparatus and a control method for a reading apparatus.

2. Related Art

Heretofore, reading apparatuses each provided with a plurality of line sensors have been known (see, for example, JP-A-2006-203840).

For a reading apparatus provided with line sensors, such as the above reading apparatus disclosed in JP-A-2006-203840, a configuration of the reading apparatus may involve a large apparatus.

SUMMARY

An advantage of some aspects of present disclosure is that, for a reading apparatus provided with line sensors, the downsizing of an apparatus utilizing the formation of the arrangement of the line sensors is achieved.

According to an aspect of the present disclosure, a reading apparatus includes a transport section configured to transport a medium in a transport direction, a plurality of line sensors including a first line sensor and a second line sensor, each of the plurality of line sensors including sensor elements arranged in an intersecting direction intersecting with the transport direction and configured to read the medium, and a plurality of signal processing circuits including a first signal processing circuit, each of the plurality of signal processing circuits respectively configured to receive one or more signals from a corresponding line sensor of the plurality of line sensors. The first line sensor corresponds to the first signal processing circuit, and the first line sensor and the second line sensor are arranged in such a way as to be separate from each other in the transport direction and overlap with each other in the intersecting direction. A space is adjacent to the second line sensor in the intersecting direction, and the first signal processing circuit is arranged in the space. The first signal processing circuit is arranged to be adjacent to the first line sensor in the transport direction.

According to this configuration, the signal processing circuits are arranged in such a way that at least one signal processing circuit constituting at least one portion of the signal processing circuits is arranged in a space defined by the arrangement of the line sensors. Thus, the space is effectively utilized, and this effective utilization of the space achieves downsizing of the reading apparatus. That is, according to the above configuration, the downsizing of the reading apparatus is achieved by utilizing the arrangement of the line sensors.

In one or more embodiments of the present disclosure, the plurality of signal processing circuits can be arranged within a space in which the first line sensor and the second sensor do not overlap with each other in the intersecting direction.

According to this configuration, the downsizing of the reading apparatus is achieved by effectively utilizing spaces generated by the formation of the arrangement of the line sensors. Further, the line sensors and circuits for processing analog signals are arranged at mutually separated positions in such a way as that the line sensors and the circuits are not mutually influenced by heat generated by the other side, and thus, the attenuation and the degradation of each of the analog signals are reduced.

In one or more embodiments of the present disclosure, each of the plurality of line sensors can output an analog signal in response to reading of the medium, and a corresponding one of the plurality of signal processing circuits processes the analog signal received from the each of the plurality of line sensors.

According to this configuration, a circuit for processing an analog signal is arranged at a position near each of the line sensors, and thus, even in a configuration in which a low-cost line sensor that outputs an analog signal is employed, the attenuation and the degradation of the analog signal are reduced.

In one or more embodiments of the present disclosure, each of the plurality of signal processing circuits can include an A/D conversion circuit for converting the analog signal input from each of the plurality of line sensors into a digital signal.

According to this configuration, the attenuation and the degradation of the analog signal output by each of the line sensors are reduced.

In one or more embodiments of the present disclosure, the plurality of signal processing circuits are arranged in respective spaces of a plurality of spaces, and a first subset of the plurality of signal processing circuits are each arranged upstream in the transport direction of the signal processing circuits of a second subset of the plurality of signal processing circuits, the first subset including a first total number of signal processing circuits larger than a second total number of signal processing circuits of the second subset.

According to this configuration, the cooling of the signal proceeding circuits are efficiently performed by utilizing air that is flown into a housing in conjunction of the transport of a reading medium and is flown along the transport direction.

In one or more embodiments of the present disclosure, a plurality of combinations of one or more line sensors of the plurality of line sensors and one or more signal processing circuits of the plurality of signal processing circuits can be respectively disposed in corresponding areas of a plurality of areas extending from an upstream side toward a downstream side in the transport direction, and a total number of the one or more signal processing circuits arranged in the upstream side in the transport direction is larger than a total number of the one or more line sensors arranged in the upstream side in the transport direction.

According to this configuration, a larger number of the signal processing circuits are arranged in an area located at the most upstream side in the transport direction by reflecting the above-described formation of the arrangement of the line sensors into the configuration. Thus, a larger number of the signal processing circuits are cooled in a way that brings about a higher cooling effect, and the cooling of the signal processing circuits is further efficiently performed.

In one or more embodiments of the present disclosure, the reading apparatus can further include a control substrate which is electrically connected to each of the signal processing circuits via a corresponding one of the plurality of signal lines and into which signals output by the plurality of signal processing circuits are input, and a connection portion disposed between the signal lines and the control substrate is arranged downstream in the transport direction from at least one corresponding signal processing circuit of the plurality of signal processing circuits.

According to this configuration, mitigation of influence on cooling of the signal processing circuits by the signal lines can be achieved.

BRIEF DESCRIPTION OF THE DRAWINGS

Embodiments of the present disclosure will be described with reference to the accompanying drawings, wherein like numbers reference like elements.

DESCRIPTION OF EXAMPLE EMBODIMENTS

Hereinafter, an embodiment of the present disclosure will be described with reference to the drawings.

Figure 1:
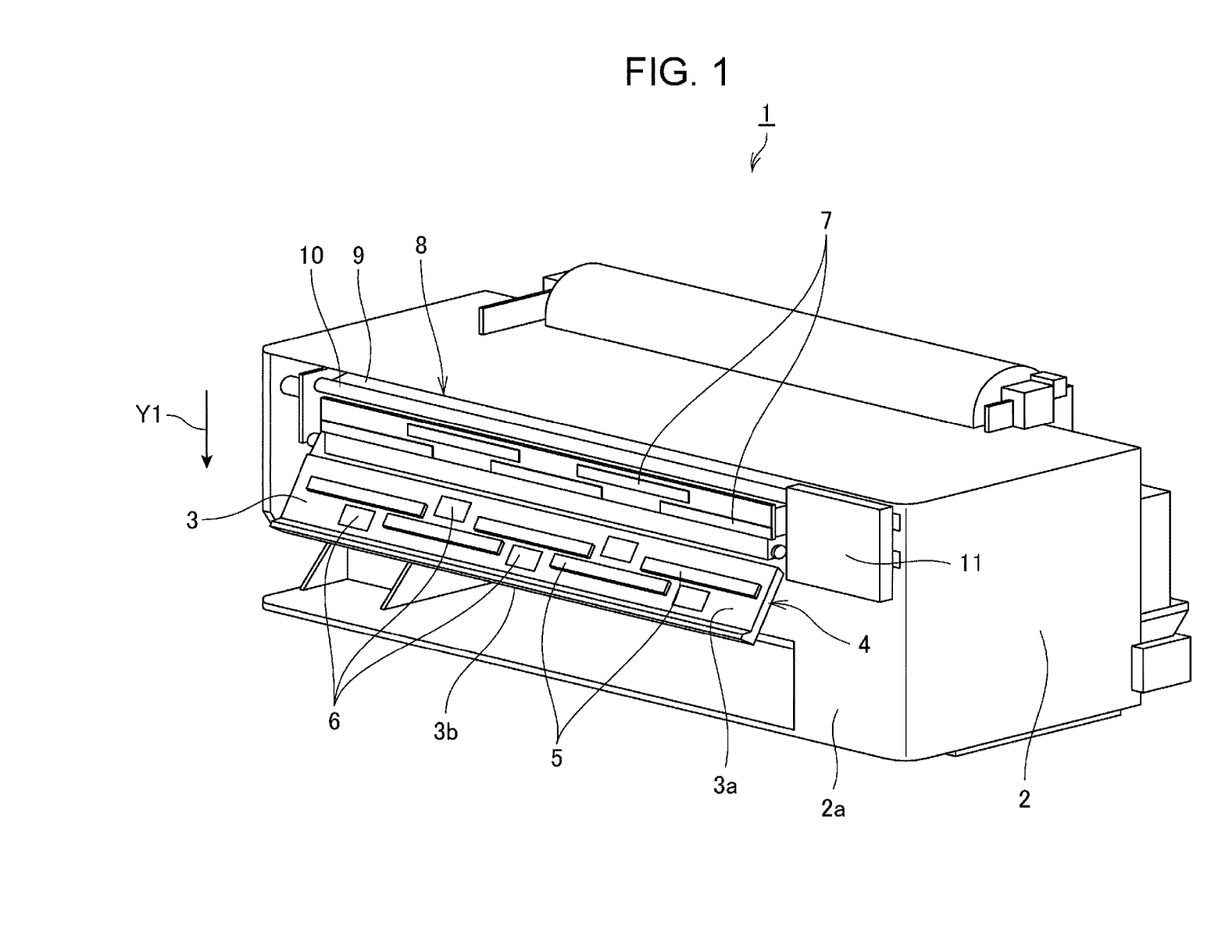
FIG. 1 is a perspective view of a medium processing apparatus according to an embodiment of the present disclosure.

FIG. 1 is perspective view of a medium processing apparatus 1, that is, a medium processing apparatus according to an embodiment (which corresponds to the reading apparatus).

The medium processing apparatus 1 is an apparatus including the function of printing images on a medium set in the apparatus, and the function of optically reading the medium. In the medium processing apparatus 1 according to the present embodiment, a medium of a large size can be set as a medium targeted for the printing and a medium targeted for the reading. As an example, in the case where single sheet paper is used as the medium, paper having an "A0" size can be set in the medium processing apparatus 1, and in the case where roll paper is used as the medium, paper having a paper width exceeding "900" millimeters can be set in the medium processing apparatus 1. Note that the medium means not only paper serving as a paper medium, but also a material capable of being set in the medium processing apparatus 1 and capable of serving as a target of the printing performed by the medium processing apparatus 1 and a target of the reading performed by the medium processing apparatus 1. Non-limiting examples of the medium include film and fabric.

Hereinafter, a medium targeted for the printing performed by the medium processing apparatus 1 will be referred to as a "printing medium", and a medium targeted for the reading performed by the medium processing apparatus 1 will be referred to as a "reading medium". In some embodiments, the printing medium and the reading medium are a same medium.

As shown in FIG. 1, the medium processing apparatus 1 includes a box-shaped housing 2. The housing 2 contains a container mechanism for containing a printing medium, a transport mechanism for transporting the printing medium, and a printing mechanism for performing printing on the printing medium, and the like. The printing mechanism of the medium processing apparatus 1 according to the present embodiment includes an ink jet head, and performs printing of images by allowing the ink jet head to form dots on the printing medium.

In an upper portion of a front face 2a of the housing 2, a front cover 3 is provided. Here, in FIG. 1, for the sake of convenience of description, part of the front face 2a of the housing 2 is transparently illustrated to allow part of members contained in the housing 2 to be in a visible state.

The front cover 3 is a cover that pivots about the center of an axis portion between a closed state and an open state. In FIG. 1, the front cover 3 is in the open state.

Further, a scanner unit 4 is provided on a back face 3a of the front cover 3. The scanner unit 4 includes a plurality of CIS (Contact Image Sensor) modules 5 (the number of which is five in the present embodiment, but which may be different in other embodiments) and a plurality of signal processing circuits 6 (the number of which is five in the present embodiment, but which may be different in different embodiments). The number of CIS modules 5 and the number of signal processing circuits 6 may be the same in some embodiments. The CIS modules 5 are arranged in a predetermined formation, and the signal processing circuits 6 are arranged in a predetermined formation. The scanner unit 4 will be described later in detail.

When the front cover 3 is in the closed state, each of white reference members 7 for use in a shading correction is disposed at a position facing to a corresponding one of the CIS modules 5 of the scanner unit 4.

When the front cover is brought into the closed state, an insertion inlet 13 (see FIG. 2) is formed at a position corresponding to a tip end 3b of the front cover 3. The insertion inlet 13 is constituted by an opening extending along the tip end 3b of the front cover 3. Further, a reading medium transport mechanism 8 (the transport section) is provided above the insertion inlet 13. The reading medium transport mechanism 8 includes a transport roller 9 and a driven roller 10. The transport roller 9 is rotated by the driving of an unillustrated motor. The driven roller 10 is provided at a position facing the transport roller 9, and is rotated by being driven by the transport roller 9. The reading medium transport mechanism 8 draws the reading medium through the insertion inlet 13 using the rotation of the transport roller 9, and then, transports the reading medium along a downwardly extending transport direction Y1. When the reading of the reading medium is performed, the transport of the reading medium is performed by the reading medium transport mechanism 8, and concurrently therewith, the reading of the reading medium is performed by the scanner unit 4.

In the inside of the housing 2, a control substrate 11 is provided on the right side of the front cover 3 being in the closed state when the medium processing apparatus 1 is viewed from its front side. The control substrate 11 includes circuits for processing signals input from the signal processing circuits 6. Here, control circuits for controlling individual portions of the medium processing apparatus 1 and any other circuits may be mounted on the control substrate 11.

Figure 2:
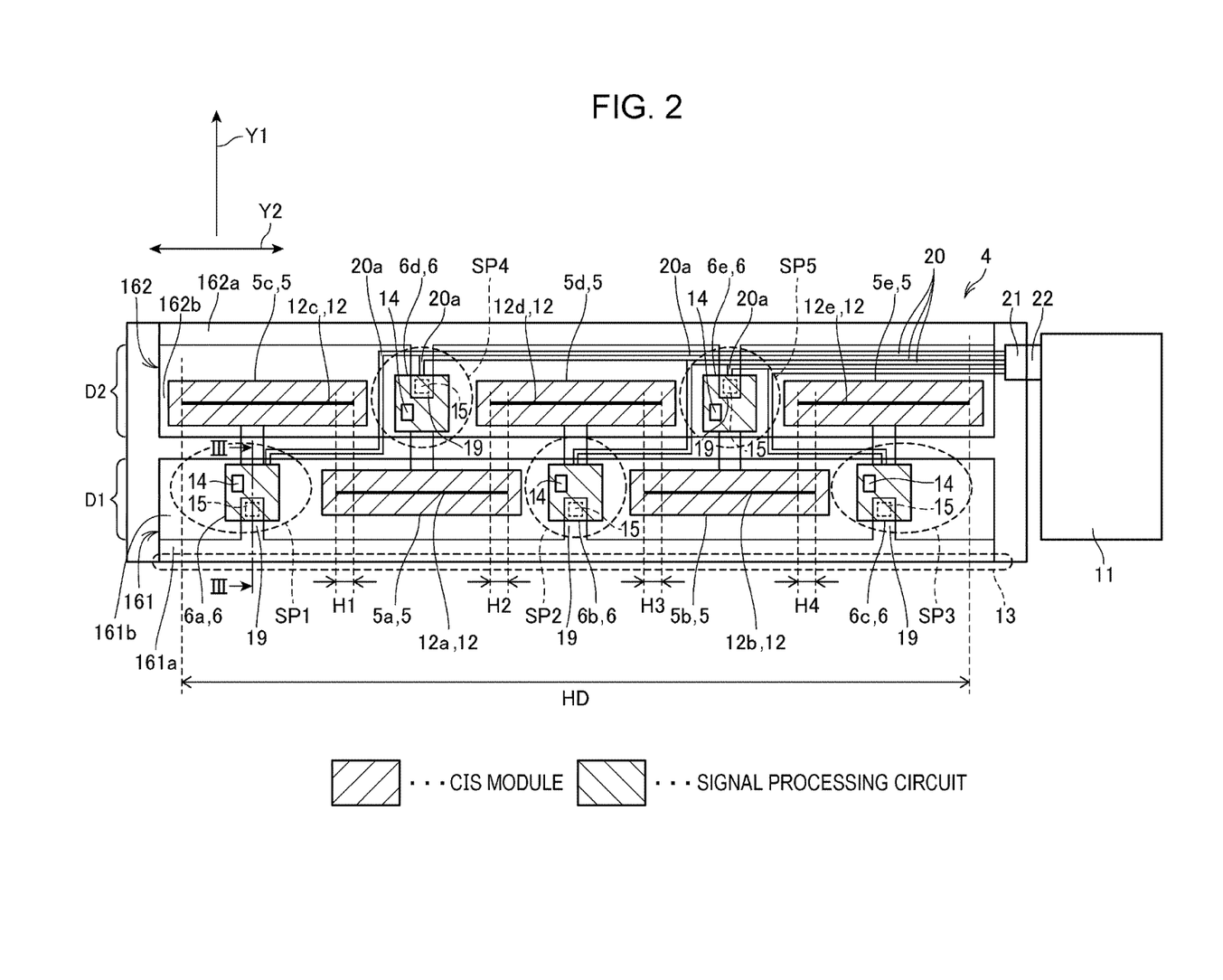
FIG. 2 is a diagram illustrating a scanner unit included in the medium processing apparatus according to an embodiment of the present disclosure.

FIG. 2 is a diagram schematically illustrating the scanner unit 4 and the control substrate 11. Here, FIG. 2 is a diagram whose upside-to-downside direction is reverse to that of the diagram illustrated in FIG. 1, and illustrates a state in which the scanner unit 4 being covered by the front cover 3 being in the closed state is viewed from the inside of the housing 2. Further, in FIG. 2, the insertion inlet 13, which is formed when the front cover 3 is in the closed state, is schematically illustrated in a form appropriate to description. It should be noted that FIG. 2 is a figure intended to describe the location relations among the CIS modules 5, the signal processing circuits 6, and the control substrate 11, and for the sake of convenience of the description, the location relations among individual members of the medium processing apparatus 1 and the sizes of the individual members thereof in FIG. 2 do not exactly correspond to those in FIG. 1.

In FIG. 2, a direction from the downside to the upside in the figure corresponds to the transport direction Y1. That is, when the reading of the reading medium is performed, the reading medium transported by the reading medium transport mechanism 8 is transported in the transport direction Y1 shown in FIG. 2. In the following description, a direction intersecting with the transport direction Y1 will be referred to as an intersecting direction Y2. The intersecting direction can be substantially orthogonal to the transport direction. Further, in the following description using FIG. 2, a direction toward the left side relative to the transport direction Y1 will be referred to as "left", and a direction toward the right side relative to the transport direction Y1 will be referred to as "right".

Each of the CIS modules 5 includes a line sensor 12, and this line sensor 12 is constituted by a CMOS image sensor (the element) that receives reflected light of light emitted by a light source, and is arranged in a line shape along the intersecting direction Y2.

As shown in FIG. 2, in the scanner unit 4, a plurality of areas are formed in a direction extending from the upstream side toward the downstream side in the transport direction Y1, and each of the areas includes combinations of one of the CIS modules 5 and one of the signal processing circuits 6. Specifically, in the scanner unit 4, a first area D1 and a second area D2 are arrayed along the direction extending from the upstream side toward the downstream side in the transport direction Y1. In the first area D1, two CIS modules, that is, a first CIS module 5a and a second CIS module 5b, are arranged as part of the CIS modules 5 in a direction extending from the left side toward the right side in FIG. 2. Further, in the first area D1, three signal processing circuits 6, that is, a first signal processing circuit 6a, a second signal processing circuit 6b, and a third signal processing circuit 6c, are arranged as part of the signal processing circuits 6 in the direction extending from the left side toward the right side in FIG. 2. In the second area D2, three CIS modules 5, that is, a third CIS module 5c, a fourth CIS module 5d, and a fifth CIS module 5e, are arranged as part of the CIS modules 5 in the direction extending from the left side toward the right side in FIG. 2. Further, in the first area D2, a fourth signal processing circuit 6d and a fifth signal processing circuit 6e are arranged as part of the signal processing circuits 6 in the direction extending from the left side toward the right side in FIG. 2.

The first CIS module 5a includes a first line sensor 12a as one of the line sensors 12; the second CIS module 5b includes a second line sensor 12b as one of the line sensors 12; the third CIS module 5c includes a third line sensor 12c as one of the line sensors 12; the fourth CIS module 5d includes a fourth line sensor 12d as one of the line sensors 12, and the fifth CIS module 5e includes a fifth line sensor 12e as one of the line sensors 12.

The left portion of the first line sensor 12a of the first CIS module 5a and the right portion of the third line sensor 12c of the third CIS module 5c, the first CIS module 5a and the third CIS module 5c being arranged separate from each other in the transport direction Y1, overlap with each other over a range H1 in the intersecting direction Y2.

The right portion of the first line sensor 12a of the first CIS module 5a and the left portion of the fourth line sensor 12d of the fourth CIS module 5d, the first CIS module 5a and the fourth CIS module 5d being arranged separate from each other in the transport direction Y1, overlap with each other over a range H2 in the intersecting direction Y2.

The left portion of the second line sensor 12b of the second CIS module 5b and the right portion of the fourth line sensor 12d of the fourth CIS module 5d, the second CIS module 5b and the fourth CIS module 5d being arranged separate from each other in the transport direction Y1, overlap with each other over a range H3 in the intersecting direction Y2.

The right portion of the second line sensor 12b of the second CIS module 5b and the left portion of the fifth line sensor 12e of the fifth CIS module 5e, the second CIS module 5b and the fifth CIS module 5e being arranged separate from each other in the transport direction Y1, overlap with each other over a range H4 in the intersecting direction Y2.

Here, in FIG. 2, a range HD is, in the intersecting direction Y2, a range within which the scanner unit 4 is capable of reading.

As described above, in the scanner unit 4, the CIS modules 5 are divided and arranged into the plurality of areas that are formed in the direction extending from the upstream side toward the downstream side in the transport direction Y1. Further, in the scanner unit 4, a line sensor 12 of any one of the CIS modules 5 and another line sensor 12 of a corresponding one of the CIS modules 5 are arranged in such a way as to be separate from each other in the transport direction Y1 and overlap with each other in the intersecting direction Y2 (e.g. overlap with each other over a predetermined range). With this formation in accordance with which the CIS modules 5 (the line sensors 12) are arranged, the following advantageous effect is brought about. That is, even employing, as the CIS module 5, a type of CIS module including a line sensor 12 having a length different than that of the range HD, the CIS modules 5 are capable of handling an area corresponding to the range HD as a target of the reading. With the configuration shown in FIG. 2, for each of the CIS modules 5 of the medium processing apparatus 1, a general-purpose CIS module 5 (e.g. a CIS module with a length less than HD, having been employed in small type reading apparatuses) can be mounted. Accordingly, the mounting of a dedicated CIS module is unnecessary, and thus, the reduction of production cost is achieved.

Hereinafter, the above formation of the arrangement of the CIS modules 5 (the line sensors 12) in the scanner unit 4 will be referred to as a "first formation".

Here, each of the CIS modules 5 performs signal processes, such as an amplification process, on a value detected by a corresponding one of the line sensors 12 in response to the detection by the corresponding one of the line sensors 12, and then, outputs a resulting detection value in the form of a analog signal to a corresponding one of the signal processing circuits 6.

Each of the signal processing circuits 6 includes at least an A/D conversion circuit 14. The each signal processing circuit 6 A/D-convers an analog signal input from a corresponding CIS module 5 using the A/D conversion circuit 14, and then, outputs a detection value in the form of a digital signal to the control substrate 11.

A reason why the configuration in which the analog signal output from the each CIS module 5 is not directly input to the control substrate 11, but is A/D-converted by the each signal processing circuit 6, and then, a resulting digital signal is input to the control substrate 11 from the each signal processing circuit 6 is employed is as follows. That is, it is difficult to arrange all of the CIS modules 5 at positions close to the control substrate 11 in view of the structure of the medium processing apparatus 1, and in the scanner unit 4, a CIS module 5 located on the further left side has a larger separation distance from the CIS module 5 to the control substrate 11. For example, the separation distance between the third CIS module 5c and the control substrate 11 is a length corresponding to the length of the front cover 3 in the intersecting direction Y2. Further, as already known, for an analog signal, the attenuation amount of a signal, which is proportional to the transmission length of the signal, is large, and the degradation of a signal due to noise is large, compared with a digital signal. Based on the above reasons, in the present embodiment, the analog signal output from the each CIS module 5 is A/D-converted using the corresponding signal processing circuit 6, and then is output to the control substrate 11 from the corresponding signal processing circuit 6. Accordingly, from the viewpoint of the reduction of the attenuation and the degradation of the analog signal output from the each CIS module 5, it can be beneficial to make the separation distance between the each CIS module 5 and the corresponding signal processing circuit 6 small. For example, the wiring distance between the each CIS module 5 and the corresponding signal processing circuit 6 may be made approximately equal by allowing each of CIS modules 5 overlapping with each other in the transport direction Y1 to be connected to a corresponding one of signal processing circuits 6 associated with the respective CIS modules 5. With this configuration, the wiring distance between the each CIS module 5 and the corresponding signal processing circuit 6 is made approximately equal and thereby the attenuation amounts of signals, and the like, are approximately the same. Thus, the analog signals output from the respective CIS modules 5 can be almost uniformly corrected, and as a result, correction processing is facilitated.

Further, since the size of the medium processing apparatus 1 increases as the size of the scanner unit 4 increases, from the viewpoint of the achievement of the downsizing of the medium processing apparatus 1, there are needs for achieving the downsizing of the scanner unit 4.

Further, each of the signal processing circuits 6 is configured to include a circuit that generates heat, that is, a heat generation circuit 15. As is already known, for the each CIS module 5, the change of its properties due to heat and the degradation of the quality of the reading result sometimes occur. Thus, it can be beneficial to prevent the heat generated by the heat generation circuit 15 of each of the signal processing circuit 6 from being conducted to a corresponding CIS module 5.

Based on the above reasons, in the scanner unit 4, through the appropriate utilization of the configuration in which the CIS modules 5 are arranged in accordance with the first formation, the signal processing circuits 6 are arranged in the following formation.

As shown in FIG. 2, in the scanner unit 4, a space SP1, that is, a space where no CIS module 5 is extended, is formed on the left side of the first CIS module 5a. The space SP1 is a "dead space" that is defined by the arrangement of the CIS modules 5 in accordance with the first formation. Further, a space SP2, that is, a dead space, is defined between the first CIS module 5a and the second CIS module 5b. Further, a space SP3, that is, a dead space, is defined on the right side of the second CIS module 5b. Further, a space SP4, that is, a dead space, is defined between the third CIS module 5c and the fourth CIS module 5d. Further, a space SP5, that is, a dead space, is defined between the fourth CIS module 4d and the fifth CIS module 5e.

Each of the spaces SP1 to SP5 is a space in which an area obtained by shifting, in a direction corresponding to the intersecting direction Y2, an area in which a corresponding CIS module 5 (the first line sensor) is arranged and an area obtained by shifting, in a direction corresponding to the transport direction Y1, an area in which another corresponding CIS module 5 (the second line sensors) is arranged overlap with each other. For example, the space SP1 is a space in which an area obtained by shifting, in a direction corresponding to the intersecting direction Y2, an area in which the first CIS module 5a (the first line sensor) is arranged and an area obtained by shifting, in a direction corresponding to the transport direction Y1, an area in which the third CIS module 5c (the second line sensor) is arranged overlap with each other.

As shown in FIG. 2, the first signal processing circuit 6a is arranged in the space SP1. The first signal processing circuit 6a is arranged below the CIS module 5c (upstream in the transport direction Y1) and adjacent to the CIS module 5a in the intersecting direction Y2. The second signal processing circuit 6b is arranged in the space SP2. The second signal processing circuit 6b is arranged below the CIS module 5d and adjacent to the CIS modules 5a and 5b in the intersecting direction Y2. The third signal processing circuit 6c is arranged in the space SP3. The third signal processing circuit 6c is arranged below the CIS module 5e and adjacent to the CIS module 5b. The fourth signal processing circuit 6d is arranged in the space SP4. The fourth signal processing circuit 6d is arranged above the CIS module 5a and adjacent to the CIS modules 5c and 5d. The fifth signal processing circuit 6e is arranged in the space SP5. The fifth signal processing circuit 6e is arranged above the CIS module 5b and adjacent to the CIS modules 5d and 5e.

As described above, each of the signal processing circuits 6 is arranged in a corresponding one of the dead spaces that are defined by the first formation of the CIS modules 5. As a result of this configuration, the signal processing circuits 6 are arranged by effectively utilizing the dead spaces and thereby the downsizing of the scanner unit 4 is achieved. Further, each of the spaces SP1 to SP5 is a space adjacent to a corresponding one of the CIS modules 5, and thus, it is achieved to arrange each of the signal processing circuits 6 at a position adjacent to a corresponding one of the CIS modules 5. This can provide for a small wiring distance between the line readers 12 and the corresponding signal processing circuits 6.

Additionally, each of the signal processing circuits 6 is arranged in a range where line sensors 12 do not overlap with each other (e.g., the ranges resulting from excluding, in the intersecting direction Y2, the ranges H1, H2, H3, and H4 in the present embodiment). With this configuration, the signal processing circuits 6 are arranged in the scanner unit 4 by effectively utilizing the dead spaces that are generated as the result of allowing the CIS modules 5 to be arranged in accordance with the first formation, and thereby, the downsizing of the medium processing apparatus 1 is achieved.

As shown in FIG. 2, a first heat radiating member 161 (heat radiating member) is provided along each of the signal processing circuits 6 on the transport-direction Y1 upstream side of each of the signal processing circuits 6 arranged in the first area D1.

Figure 3:
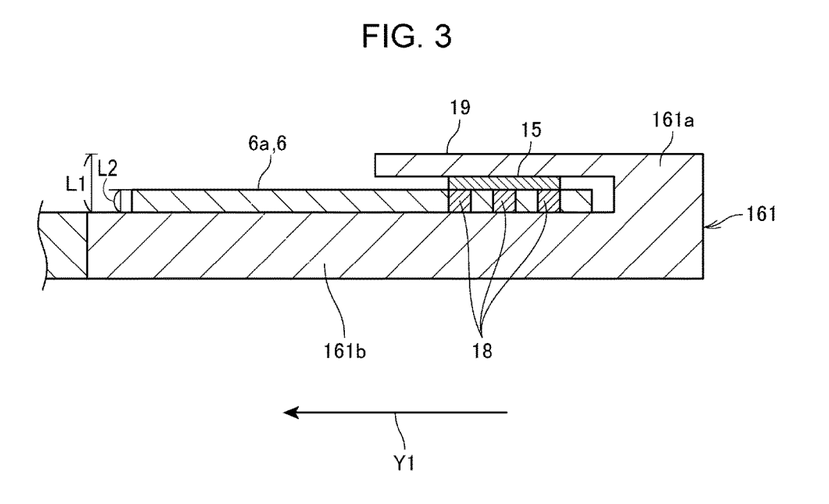
FIG. 3 is a cross-sectional view taken along the line III-III of FIG. 2.

FIG. 3 is a cross-sectional view taken along the line III-III of FIG. 2.

As shown in FIG. 3, the first heat radiating member 161 includes a first radiating portion 161a and a first extending portion 161b. The first heat radiating member 161 is constituted by a material having high thermal conductivity. For example, the first heat radiating member 161 is constituted by a material containing aluminum.

As shown in FIGS. 2 and 3, the first heat radiating portion 161a is a member that is located on the further upstream side than each of the signal processing circuits 6 arranged in the first area D1 in the transport direction Y1 and that extends along these signal processing circuits 6. The first heat radiating portion 161a extends in the intersecting direction Y2 along the transport-direction Y1 upstream-side ends of the respective signal processing circuits 6 arranged in the first area D1, from a position leftwardly shifted from the left end of the first signal processing circuit 6a up to a position rightwardly shifted from the right end of the third signal processing circuit 6c.

The first extending portion 161b is a member disposed on the further front-cover 3 side than the signal processing circuits 6 and extending across an area including the areas of the signal processing circuits 6. Each of the signal processing circuits 6 arranged in the first area D1 is fixed to the first extending portion 161b in a state of being mounted on the first extending portion 161b.

The first heat radiating member 161 functions as a heatsink for radiating heat generated by the signal processing circuits 6 arranged in the first area D1. That is, the first heat radiating member 161 is constituted by a material having high thermal conductivity, such as a material containing aluminum. Further, the heat generated by the signal processing circuits 6 is conducted to the first heat radiating member 161, which is constituted by a material having high thermal conductivity, and then is radiated by the first heat radiating portion 161a of the first heat radiating member 161. Here, the first heat radiating portion 161a is cooled by external air that is flown into the housing 2 through the insertion inlet 13 in conjunction with the transport of the reading medium by the reading medium transport mechanism 8. With this configuration, cooling of the signal processing circuits 6 is readily accomplished.

As shown in FIG. 3, the first heat radiating member 161 includes the first heat radiating portion 161a on the further insertion-inlet 13 side (on the transport-direction Y1 upstream side) than the first signal processing circuit 6a(6). The first heat radiating member 161 includes generated heat conducting members 19, and one of the generated heat conducting members 19 protrudes toward the transport direction Y1 and is in contact with the surface of at least the heat generation circuit 15 among circuits included in the first signal processing circuit 6a. The heat generated by the circuits including the heat generation circuit 15 is conducted to the first heat radiating member 161 through the generated heat conducting member 19, and then is radiated by the first heat radiating member 161.

In each of the signal processing circuits 6 arranged in the first area D1, the heat generation circuit 15 is provided close to the first heat radiating portion 161a, compared with the other circuits provided in the each signal processing circuit 6. With this configuration, the heat generated by the heat generation circuit 15 is efficiently radiated.

Further, as shown in FIG. 3, in the substrate of the signal processing circuit 6, thermal vias 18 (heat conducting members) are provided at positions corresponding to the heat generation circuit 15. These thermal vias 18 conduct the heat generated by the heat generation circuit 15 to the first extending portion 161b. With this configuration, the heat generated by the heat generation circuit 15 is efficiently conducted to the first heat radiating member 161, and thus, the heat generated by the heat generation circuit 15 is efficiently radiated. Further, since the heat generation circuit 15 and the generated heat conducting member 19 are in contact with each other, and the generated heat conducting member 19 and the first heat radiating portion 161a are in contact with each other, the heat generated by the heat generation circuit 15 is efficiently conducted to the first heat radiating member 161, and thus, the heat generated by the heat generation circuit 15 is efficiently radiated.

The first heat radiating member 161 is constituted in such a way as to be unified with the front cover 3 constituting part of the housing 2. That is, the first heat radiating member 161 is part of the housing 2. With this configuration, the increase of the size of the medium processing apparatus 1 due to the existence of the first heat radiating member 161 is restrained.

FIG. 3 illustrates a height L1 of the CIS module 5 and a height L2 of the signal processing circuit 6 in the case where the surface of the first extending portion 161b functions as a base. As shown in FIG. 3, the height L1 of the CIS module 5 is higher than the height L2 of the signal processing circuit 6.

As shown in FIG. 2, a second heat radiating member 162 (the heat radiating member) is provided along each of the signal processing circuits 6 on the transport-direction Y1 downstream side of each of the signal processing circuits 6 arranged in the second area D2. The second heat radiating member 162 is a member having a similar function as that of the first heat radiating member 161, and includes a second heating portion 162a and a second extending portion 162b. The second heating portion 162a has the same or a similar configuration and function as those of the first heating portion 161a, and the second extending portion 162b has the same configuration and function as those of the first extending portion 161b. That is, the second heat radiating member 162 radiates the heat generated by the signal processing circuits 6 arranged in the second area D2. The relation between the second heat radiating member 162 and the signal processing circuits 6 arranged in the second area D2 is the same as, or similar to, the relation between the second heat radiating member 161 and the signal processing circuits 6 arranged in the first area D1, and thus, redundant detailed description of the structure of the second heat radiating member 162 is omitted here.

Here, from the viewpoint of the achievement of the downsizing of the medium processing apparatus 1, when the reading of the reading medium is performed, the signal processing circuits 6 mounted on a face facing the reading face of the reading medium can be arranged in such a way as to allow each of the signal processing circuits 6 to overlap with a corresponding one of the CIS modules 5 when the signal processing circuits 6 and the CIS modules 5 are viewed from a direction orthogonal to the reading face. In this case, however, the heat generation circuit 15 of the each signal processing circuit 6 is in close to the corresponding CIS module 5 because of the structure, and thus, the corresponding CIS module 5 is in a state of being easily influenced by the heat generated by the each signal processing circuit 6. On the contrary, in the present embodiment, in the scanner unit 4, the signal processing circuits 6 are arranged in the respective dead spaces that are generated as the result of allowing the CIS modules 5 to be arranged in accordance with the first formation, and thus, not only the downsizing of the medium processing apparatus 1 is achieved, but also the influence on each of the CIS modules 5 by the heat generated by a corresponding one of the signal processing circuits 6 is effectively reduced because the separation distance between the each CIS module 5 and the heat generation circuit 15 of the corresponding signal processing circuit 6 is made larger than the above case where the each CIS module 5 and the corresponding signal processing circuit 6 are arranged in such a way as to overlap with each other when viewed from the direction orthogonal to the reading face. Further, as described above, the heat generated by the signal processing circuits 6 are efficiently radiated by the first heat radiating member 161 and the second heat radiating member 162, and thus, in this respect as well, the influence on the CIS modules 5 by the heat generated by the signal processing circuits 6 is effectively reduced.

As shown in FIG. 2, the number of the signal processing circuits 6 arranged in the first area D1 (e.g., three) is larger than the number of the signal processing circuits 6 arranged in the second area D2 (e.g., two). That is, the number of the signal processing circuits 6 arranged on the upstream side in the transport direction Y1 is larger than the number of the signal processing circuits 6 arranged on the downstream side in the transport direction Y1.

This can be beneficial for at least the following reason. The area located on the upstream side in the transport direction Y1 is positioned closer to the above-described insertion inlet 13 than the area located on the downstream side in the transport direction Y1. Here, when the reading of the reading medium is performed, external air is flown into the inside of the housing 2 through the insertion inlet 13 in conjunction with the transport of the reading medium by the reading medium transport mechanism 8. The air that is flown into the inside of the housing 2 can be used for cooling the signal processing circuits 6 mounted in the scanner unit 4. Further, the air having been flown into the inside of the housing 2 is flown along the transport direction Y1, and the temperature of the air further rises and the pressure of the air further decreases as the air is flown toward the further downstream side in the transport direction Y1. For this reason, in the case where the signal processing circuits 6 are cooled by utilizing the air that is flown through the insertion inlet 13 in conjunction with the transport of the reading medium by the reading medium transport mechanism 8, the signal processing circuits 6 arranged in the area located on the upstream side in the transport direction Y1 is cooled in a way that brings about a higher cooling effect than the signal processing circuits 6 arranged in the area located on the downstream side in the transport direction Y1. Based on the above reason, by allowing the number of the signal processing circuits 6 arranged on the upstream side in the transport direction Y1 to be larger than the number of the signal processing circuits 6 arranged on the downstream side in the transport direction Y1, a larger number of the signal processing circuits 6 are cooled in a way that brings about a higher cooling effect, and the cooling of the signal processing circuits 6 is further efficiently performed.

As shown in FIG. 2, the area D1 is an area that is located on the most upstream side in the transport direction Y1 among the areas. Further, the number of the signal processing circuits 6 arranged in the first area D1 is "three", and the number of the signal processing circuits 6 arranged in the first area D1 is "two". That is, the number of the signal processing circuits 6 arranged in the area located on the most upstream side in the transport direction Y1 is larger than the number of the CIS modules 5 arranged in the relevant area. This configuration that allows the number of the signal processing circuits 6 arranged in the area located on the most upstream side in the transport direction Y1 to be larger than the number of the CIS modules 5 arranged in the relevant area brings about the following advantageous effect. That is, a larger number of the signal processing circuits 6 are arranged in the area located on the most upstream side in the transport direction Y1 by reflecting the formation (the first formation) of the arrangement of the CIS modules 5. With this configuration, a larger number of the signal processing circuits 6 are cooled in a way that brings about a higher cooling effect, and the cooling of the signal processing circuits 6 is further efficiently performed.

Note that each of the first area D1 and the second area D2 corresponds to one of "the intersecting direction signal processing circuit areas". That is, in the present embodiment, when any one of the signal processing circuits 6 is shifted in a direction corresponding to the intersecting direction Y2, an area including other signal processing circuits 6 that overlap with the any one of the signal processing circuits 6 is set as one of "the intersecting direction signal processing circuit areas". Further, in the present embodiment, when, among the intersecting direction signal processing circuit areas (the first area D1 and the second area D2 in the present embodiment), an upstream side area located on the upstream side in the transport direction Y1 (the first area D1 in the present embodiment) and a downstream side area located on the downstream side in the transport direction Y1 (the second area D2 in the present embodiment) are arranged, the number of the signal processing circuits 6 arranged in the upstream side area is allowed to be larger than number of the signal processing circuits 6 arranged in the downstream side area.

Each of the signal processing circuits 6 is connected to the control substrate 11 via a corresponding one of flexible substrates 20 (signal lines). The digital signal output by each of the signal processing circuits 6 is output to the control substrate 11 via a corresponding one of the flexible substrates 20.

As shown in FIG. 2, for each of the signal processing circuits 6, the flexible substrate 20 connected to the each signal processing circuit 6 is extended toward a bending portion 20a located on the further downstream side than the second area D2 once in a state of bypassing one or more other signal processing circuits 6 and one or more CIS modules 5; is caused to bend toward the right side at the bending portion 20a; and is extended from the bending portion 20a up to a scanner-side connector 21 (the connection portion) along the intersecting direction Y2.

The control substrate 11 includes a control-circuit side connector 22, and the scanner-side connector 21 and the control-side connector 22 are in a state of being electrically connected to each other when the front cover 3 is in the closed state. Additionally, the connection between the each processing circuit 6 and the control substrate 11 may not be via the flexible substrate 20, but may be via a fixed wiring pattern.

As shown in FIG. 2, the scanner-side connector 21 is arranged on the further downstream side in the transport direction Y1 than the signal processing circuits 6 arranged on the most downstream side in the transport direction Y1 (the signal processing circuits 6 arranged in the second area D2). With this configuration, the following advantageous effect is brought about. That is, since the scanner-side connector 21 is in a state of being arranged on the further downstream side in the transport direction Y1 than the signal processing circuits 6 arranged on the most downstream side in the transport direction Y1 (the signal processing circuits 6 arranged in the second area D2), the flexible substrates 20 extending toward the scanner-side connector 21 are, in the scanner unit 4, not arranged on the further upstream side in the transport direction Y1 than the signal processing circuits 6 arranged on the most upstream side in the transport direction Y1. Accordingly, it is prevented that the flexible substrates 20 block the air having been flown from the insertion inlet 13 in conjunction with the transport of the reading medium from being brought into contact with the signal processing circuits 6.

As described above, the medium processing apparatus 1 (the reading apparatus) according to the present embodiment includes the reading medium transport mechanism 8 (the transport section), which transports the reading medium in the transport direction Y1, and the plurality of line sensors 12, which allow the CMOS image sensors (the elements) arranged in the intersecting direction Y2 intersecting with the transport direction Y1 to read the reading medium. In the medium processing apparatus 1, a first line sensor 12 associated with any one of the line sensors 12 and a second line sensor 12 associated with any other one of the line sensors 12 are arranged in such a way as to be separate from each other in the transport direction Y1 and overlap with each other (e.g. over a predetermined range) in the intersecting direction Y2. Further, at least one signal processing circuit constituting at least a portion of the signal processing circuits 6 into each of which a signal output by a corresponding one of the line sensors 12 is input is arranged in each of at least one space in such a way that the each of the at least one space is an area in which an area obtained by shifting, in a direction corresponding to the intersecting direction Y2, an area in which the first line sensor 12 is arranged overlaps with an area obtained by shifting, in a direction corresponding to the transport direction Y1, an area in which the second line sensor 12 is arranged. According to this configuration, the signal processing circuits 6 are arranged in such a way that at least one signal processing circuit 6 constituting at least one portion of the signal processing circuits 6 is arranged in each of at least one space generated by the formation of the arrangement of the line sensors. Thus, the space is effectively utilized, and this effective utilization of the space achieves the downsizing of the medium processing apparatus 1. That is, according to the above configuration, the downsizing of the medium processing apparatus 1 is achieved by utilizing the formation of the arrangement of the line sensors 12.

Further, in the present embodiment, the signal processing circuits 6 are arranged within ranges in each which the line sensors 12 do not overlap with each other in the intersecting direction Y2.

According to this configuration, the downsizing of the medium processing apparatus 1 is achieved by effectively utilizing spaces generated by the formation of the arrangement of the line sensors 12, and thereby arranging the signal processing circuits 6.

Further, in the present embodiment, each of the line sensors 12 outputs an analog signal in response to the reading of the reading medium, and a corresponding one of the signal processing circuits 6 processes the analog signal input from the each of the line sensors 12.

According to this configuration, the attenuation and the degradation of the analog signal output by each of the line sensors 12 are reduced.

Further, in the present embodiment, each of the signal processing circuits 6 includes the A/D conversion circuit 14, which converts the analog signal input from a corresponding one of the line sensor 12 into a digital signal.

According to this configuration, the attenuation and the degradation of the analog signal output by each of the line sensors 12 are reduced.

Further, in the present embodiment, when any one of the signal processing circuits 6 is shifted in a direction corresponding to the intersecting direction Y2, an area including at least other one of the signal processing circuit 6 that overlaps with the any one of the signal processing circuits 6 are set as one of intersecting direction signal processing circuit areas, and when, among the intersecting direction signal processing circuit areas, an upstream side area located on the upstream side in the transport direction Y1 and a downstream side area located on the further downstream side than the upstream side area in the transport direction Y1 are arranged, the total number of signal processing circuits 6 arranged in the upstream side area is set so as to be larger than the total number of signal processing circuits 6 arranged in the downstream side area.

According to this configuration, the cooling of the signal processing circuits 6 is efficiently performed by utilizing air that is flown into the housing 2 in conjunction with the transfer of the reading medium, and is flown along the transport direction Y1.

Further, in the present embodiment, combinations of one or more line sensors 12 and one or more signal processing circuits 6 are each divided and arranged into a corresponding one of a plurality of areas arranged from the upstream side toward the downstream side in the transport direction Y1, and the total number of the one or more signal processing circuits 6 arranged in the most upstream side area in the transport direction Y1 is set so as to be larger than the total number of the one or more line sensors 12 arranged in the most upstream side area in the transport direction Y1.

According to this configuration, a larger number of the signal processing circuits 6 are arranged in the area located on the most upstream side in the transport direction Y1 by reflecting the formation of the arrangement of the line sensors 12. Thus, a larger number of the signal processing circuits 6 are cooled in a way that brings about a higher cooling effect and the cooling of the signal processing circuits 6 are further efficiently performed.

Further, the medium processing apparatus 1 according to the present embodiment further includes the control substrate 11, which is connected to each of the signal processing circuits 6 via a corresponding one of the flexible circuits 20 (the signal lines) and into which signals output by the signal processing circuits 6 are input. Further, the scanner-side connector 21 (the connection portion), which connects the flexible substrates 20 to the control substrate 11, is disposed on the further downstream side in the transport direction Y1 than the signal processing circuits 6 arranged on the most downstream side in the transport direction Y1.

According to this configuration, it is prevented that the cooling of the signal processing circuits 6 is influenced by the existence of the flexible substrates 20 and thereby is blocked.

Further, in the present embodiment, at each of two positions corresponding to the positions of the respective signal processing circuits 6, a corresponding one of the first heat radiating member 161 (heat radiating member) and the second heating member 162 (heat radiating member), which radiate the heat generated by the signal processing circuits 6, are arranged.

According to this configuration, the signal processing circuits 6 are efficiently cooled through the first heat radiating member 161 and the second heat radiating member 162.

Further, in the present embodiment, each of the signal processing circuits 6 includes a corresponding one of the heat generation circuits 15. Further, the heat generation circuit 15 among circuits included in each of the signal processing circuits 6 is provided close to the first heat radiating member 161 or the second heat radiating member 162.

According to this configuration, each of the heat generation circuits 15 is efficiently cooled through the first heat radiating member 161 or the second heat radiating member 162.

Further, in the present embodiment, the first heat radiating member 161 and the second heat radiating member 162 are part of the housing 2.

According to this configuration, the increase of the size of the medium processing apparatus 1 due to the existence of the first heat radiating member 161 and the second heat resisting member 162 is restrained.

Further, in the present embodiment, the thermal vias 18 (generated heat conducting members), which conduct the heat generated by a corresponding heat generation circuit 15, are provided between the corresponding heat generation circuit 15 and the first heat radiating member 161 or the second heat resisting member 162.

According to this configuration, the heat generated by the heat generation circuits 15 is efficiently radiated.

It should be noted that the aforementioned embodiment is only one embodiment of the present disclosure, and any modification and any application can be made within the scope of the present disclosure.

Figure 4:
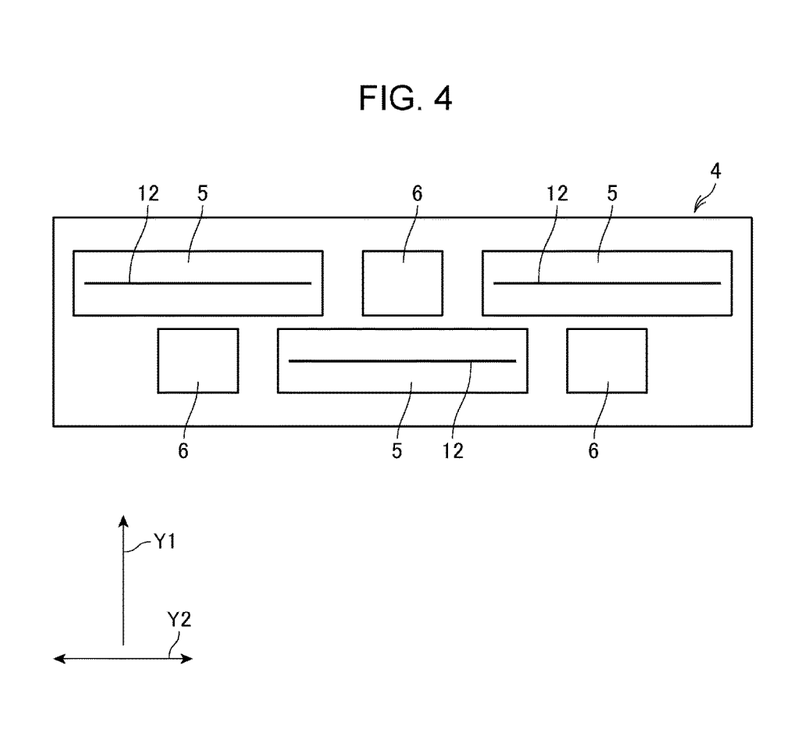
FIG. 4 is a diagram illustrating a modification example of the scanner unit according to an embodiment of the present disclosure.
Figure 5:
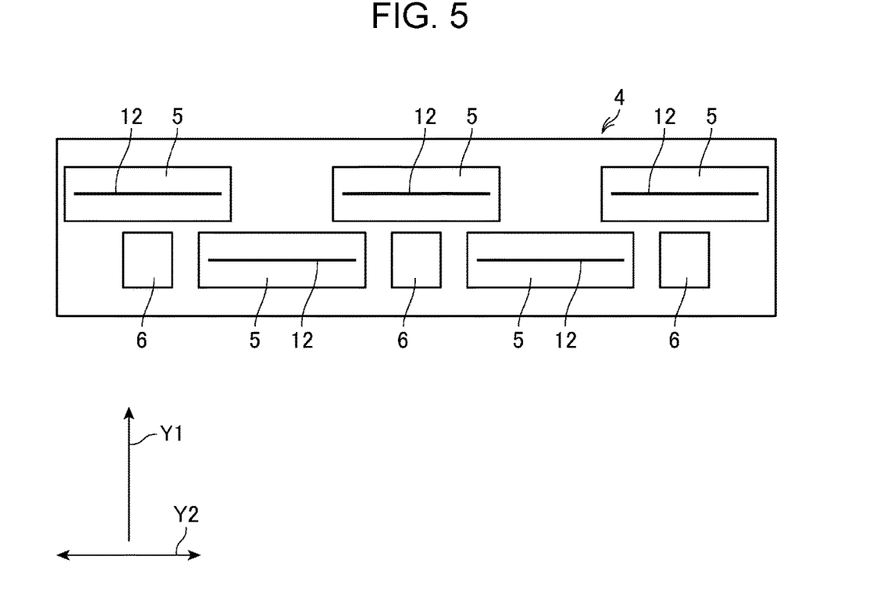
FIG. 5 is a diagram illustrating another modification example of the scanner unit according to an embodiment of the present disclosure.

For example, the formation of the arrangement of the CIS modules 5 and the formation of the arrangement of the signal processing circuits 6 are not limited to the formation having been exemplified in the aforementioned embodiment. As an example, in the case where three CIS modules 5 are used, as shown in a formation illustrated in FIG. 4, the CIS modules 5 may be arranged in such a way that one portion of each of two CIS modules among the three CIS modules overlaps with the other one of the three CIS modules in the transport direction Y1, and a signal processing circuit 6 may be arranged in a space within which no CIS module 5 is extended. Further, as another example, in the case where the number of signal processing circuits 6 is smaller than the number of CIS modules 5, a formation in which each of the signal processing circuits 6 is arranged in a space which is located on the insertion-inlet 13 side and within which no CIS module 5 is extended may be employed.

Further, for example, a configuration that allows a member having low thermal conductivity to be interposed between each of the CIS module 5 and a corresponding one of the signal processing circuit 6 may be employed. Further, a configuration that allows a space to be provided between each of the CIS module 5 and a corresponding one of the signal processing circuits 6 may be employed. According to these configurations, the conduction of the heat generated by each of the signal processing circuits 6 to a corresponding one of the CIS modules 5 is further effectively reduced.

Further, for example, in the aforementioned embodiment, the medium processing apparatus 1 includes, as heat radiating members, two members, that is, the first heat radiating member 161 and the second heat radiating member 162. For this configuration, a configuration that allows any one of the heat radiating members to be provided and allows the heat generated by the signal processing circuits 6 to be radiated through the any one of the heat radiating members is applicable.

Further, for example, the structure of the first radiating member 161 and the second radiating member 162 is not limited to the structure having been shown in the aforementioned embodiment. For example, a portion of the first heat radiating member 161 may be directly in contact with each of the heat generation circuits 15. For the second heat radiating member 162, the same configuration is applicable.

Further, for example, in the present embodiment, the medium processing apparatus 1, which includes not only the function of reading the reading medium, but also the function of performing printing on the printing medium, has been described as an example of the reading apparatus, but an apparatus to which the present disclosure is to be applied is sufficient, provided that this apparatus has the function of reading a medium.

Further, for example, the method for reading the reading medium is not limited to such a CIS close contact sensor method using the CMOS image sensors as sensor elements included in the line sensors 12. For example, a CCD optical reduction method using CCD image sensors is applicable as a sensor element included in the line sensors 12.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto.

What is claimed is:
1. A reading apparatus comprising:
   a transport section configured to transport a medium in a transport direction,
   a plurality of line sensors including a first line sensor and a second line sensor, each of the plurality of line sensors including sensor elements arranged in an intersecting direction intersecting with the transport direction and configured to read the medium; and
   a plurality of signal processing circuits including a first signal processing circuit, each of the plurality of signal processing circuits respectively configured to receive one or more signals from a corresponding line sensor of the plurality of line sensors;
   wherein the first line sensor corresponds to the first signal processing circuit, and the first line sensor and the second line sensor are arranged in such a way as to be separate from each other in the transport direction and overlap with each other in the intersecting direction,
   wherein a space is adjacent to the second line sensor in the intersecting direction, and the first signal processing circuit is arranged in the space; and
   the first signal processing circuit is arranged to be adjacent to the first line sensor in the transport direction.
2. The reading apparatus according to claim 1, wherein the space in which the first of signal processing circuit is arranged is a space in which the first line sensor and the second sensor do not overlap with each other in the intersecting direction.

3. The reading apparatus according to claim 1, wherein each of the plurality of line sensors is configured to output an analog signal in response to reading of the medium to a respective corresponding signal processing circuit of the plurality of signal processing circuits, and the plurality of signal processing circuits are configured to process the respective analog signals received from the corresponding line sensors.

4. The reading apparatus according to claim 3, wherein each of the plurality of signal processing circuits includes an analog-to-digital (A/D) conversion circuit configured to convert the respective analog signals received from the plurality of line sensors into digital signals.

5. The reading apparatus according to claim 1,
wherein the plurality of signal processing circuits including the first signal processing circuit are arranged in respective spaces of a plurality of spaces including the space adjacent to the second line sensor in the intersecting direction, and
wherein a first subset of the plurality of signal processing circuits are each arranged upstream, in the transport direction, of the signal processing circuits of a second subset of the plurality of signal processing circuits, the first subset including a first total number of signal processing circuits larger than a second total number of signal processing circuits of the second subset.

6. The reading apparatus according to claim 1,
wherein a plurality of combinations of one or more line sensors of the plurality of line sensors and corresponding one or more signal processing circuits of the plurality of signal processing circuits are respectively disposed in corresponding areas of a plurality of areas extending from an upstream side in the transport direction toward a downstream side in the transport direction, and a total number of the one or more signal processing circuits arranged at the upstream side in the transport direction is larger than a total number of the one or more line sensors arranged at the upstream side area in the transport direction.

7. The reading apparatus according to claim 1, further comprising a control substrate which is electrically connected to each of the signal processing circuits via a corresponding one of the plurality of signal lines and is configured to receive signals output by the plurality of signal processing circuits,
wherein a connection portion disposed between the signal lines and the control substrate is arranged further downstream in the transport direction than is at least one of the signal processing circuits of the plurality of signal processing circuits arranged downstream in the transport direction of a corresponding line sensor of the plurality of line sensors.

* * * * *